United States Patent [19]
Cantarini

[11] Patent Number: 6,156,821
[45] Date of Patent: Dec. 5, 2000

[54] PROCESS AND APPARATUS FOR PREPARING DRY-BLENDS OF THERMOPLASTIC POLYMERS WITH ADDITIVES

[75] Inventor: Iuri Cantarini, Ferrara, Italy

[73] Assignee: Montell Technology Company bv, Netherlands

[21] Appl. No.: 09/179,617

[22] Filed: Oct. 27, 1998

[30] Foreign Application Priority Data

Oct. 28, 1997 [EP] European Pat. Off. ............. 97203328

[51] Int. Cl.[7] ....................................................... C08K 9/00
[52] U.S. Cl. ............................................................. 523/200
[58] Field of Search ................................................ 523/200

[56] References Cited

U.S. PATENT DOCUMENTS

| | | | |
|---|---|---|---|
| 3,640,861 | 2/1972 | Hsia | 252/62.1 |
| 4,002,593 | 1/1977 | Jones | 260/40 |
| 4,444,958 | 4/1984 | Gilles | 525/432 |
| 5,053,444 | 10/1991 | Trotoir | 523/351 |
| 5,158,992 | 10/1992 | Caselli et al. | |
| 5,516,814 | 5/1996 | Trotoir | 523/122 |
| 5,536,613 | 7/1996 | Chang | 430/137 |
| 5,565,132 | 10/1996 | Salyer | 252/70 |
| 5,789,493 | 8/1998 | Aaken | 525/438 |
| 5,866,639 | 2/1999 | Dorchester | 523/171 |
| 5,919,838 | 7/1999 | Mizobuchi | 523/161 |

FOREIGN PATENT DOCUMENTS

| | | |
|---|---|---|
| 0471463 A2 | 2/1992 | European Pat. Off. |
| 1392261 | 4/1975 | United Kingdom. |

*Primary Examiner*—Paul R. Michl
*Attorney, Agent, or Firm*—Bryan Cave LLP

[57] ABSTRACT

Blends can be obtained from polymers in particle form and powdery additives of higher melting point by heating the polymer particles so as to create a molten layer on their surface and forcing the powdery particles into said layer. After cooling, components of even very different density and morphology result inseparable. The process can be performed in a gas-loop, wherein the polymer and the additives are dragged by a hot gas flow.

9 Claims, 2 Drawing Sheets

PROCESS AND APPARATUS FOR PREPARING DRY-BLENDS OF THERMOPLASTIC POLYMERS WITH ADDITIVES

The present invention relates to a process for blending polymer particles with powdery additives, in such a way that separation of the components of the blend cannot occur after the treatment.

It is also provided an apparatus suitable to perform the said process.

The invention further relates to polymers, especially ethylene and propylene homo- and copolymers, in particle form coated with powdery additives.

Resins obtained by a polymerisation process generally undergo an extrusion process to impart them the desired morphology. During the extrusion process, one may add to the resin other components, such as colorants or anti-blocking agents. A big part of the latter are in the form of powders.

In order to assure the necessary homogeneity to the resulting product, dry-blends of the resin and the other components must be created before the extrusion process. However the different characteristics of the components to be blended (i.e. particle dimensions, morphology and density) render this step very difficult.

A common way to obtain such blends is to employ slow mixers, the adherence of the powdery additives to the surface of the polymer particles being improved by means of oils or it is due to the sticking properties of molten additives, when the latter are endowed with a melting point lower than that of the resin.

U.S. Pat. No. 5,158,992 describes a process by which the polymer particles are stabilised by mixing them with additives in the molten state, thus obtaining coated or, at least, impregnated particles. This process is suitable for polymers which come out from the polymerisation process already endowed with desired morphological properties and therefore do not need to undergo an extrusion process, but need to be stabilised in order to be stored or transported.

The blends obtained by the above mentioned processes, however, present considerable drawbacks, such as difficult handling and transport, long term segregation, incompatibility with pneumatic conveying and unsatisfactory homogeneity; if oils or binders are used, an impurity will enter the final composition, which can worsen the properties of the obtained products.

GB patent 1392261 discloses a process whereby powdery additives are fixed on the surface of polyester or polyamide granules by mixing the two components in high speed rotary mixers, under temperatures chosen in such a way that the mechanical action of the paddles on the granules causes the surface of the latter to become plasticised and thus the additives can be fixed thereon.

A similar process for granular polypropylene is described in EP-A-0 471 463, whereby a particular kind of high speed mixer is employed.

Blending processes carried out in high speed mixer like those mentioned above require a careful choice of the operating parameters such as jacket temperature, speed of the shafts, residence time and geometric configuration of the mixing device; in fact, it is very easy to incur into formation of agglomerates, peeling or even breakage of the polymer particles and sheeting of the walls of the mixer.

It is known that the use of other kinds of high speed mixers to create blends of polypropylene or polyethylene and powdery additives leads to severe problems of particle breakage or fusion, with eventual formation of polymer agglomerates, unless operating conditions are chosen which could not assure a satisfactorily resistant coating of the resin by the additives and segregation could still occur.

Therefore the exigency is felt of a process capable to yield satisfactorily homogeneous dry-blends, not subject to segregation phenomena, of a wide range of thermoplastic polymers, without the use of oils or binders and without the drawbacks typical of the processes performed in high speed mixers.

This problem is solved according to the present invention by forcing the additive particles to penetrate into the outer layer of the polymer particles, said outer layer being allowed to soften or to melt.

Thus the present invention provides a process for preparing thermoplastic polymer particles additivated with powdery additive particles, the additive having a melting point higher than that of the polymer, the said process comprising the following steps:

a) creating a molten or softened polymer layer on the surface of the polymer particles, while keeping the polymer particles under fluidization;

b) introducing the polymer particles and the additive particles, simultaneously or in whatever order, in a same volume region where, on average, the relative velocity between a polymer particle and an additive particle is higher than that between two polymer particles, the difference of relative velocities being able to provide impacts between the additive particles and the polymer particles such that the additive particles are forced into the molten or softened layer on the surface of the polymer particles.

The process can advantageously be performed in a gas-loop, wherein a gas flow is established, which is capable to drag the particles; due to the different velocities assumed by particles of different morphology and density in a gas flow, impacts take place between the resin and the additive particles, while impacts between two resin particles are less probable and less strong; thus sticking among resin particles and formation of agglomerates are avoided. The gas is generally heated and kept at a temperature slightly below (about 10–20° C. below) the melting point of the resin so that, also due to friction forces and impacts, the outer layer of the resin particles melts, thus enabling the forcing of the additive into said layer to be performed. Control of the process temperature is possible by means of measuring devices placed along the loop; preferably the temperature is measured at two points, up and downstream the heating device. During normal operation no relevant differences are detected between the two measurements, due to the high speed of the gas. The resin can undergo the process immediately as it comes out from the production process; its sensible heat is thus utilised.

Cooling may follow the process, thus allowing the molten or softened layer to solidify, or the product can also be immediately sent to the next process step, for example extrusion. The process of the present invention can be carried out either continuously or by batch operation.

The gas which flows throughout the gas-loop and which carries the polymer particles also heating them, must be chosen among gases which cannot react with the polymer: nitrogen is generally employed, but other gases, such as air, can be employed, depending from the properties of the processed particles. The pressure under which the process is performed can conveniently be close to atmospheric: differences throughout the loop are only due to the pressure drop due to the circulation.

The gas speed is generally around 20 m/s, and an average difference of speed of at least 10 m/s between the resin and the additive particles is normally created; this provides effective impacts between particles to be blended.

The invention also provides an apparatus suitable to perform the process of the invention.

Figure 1:
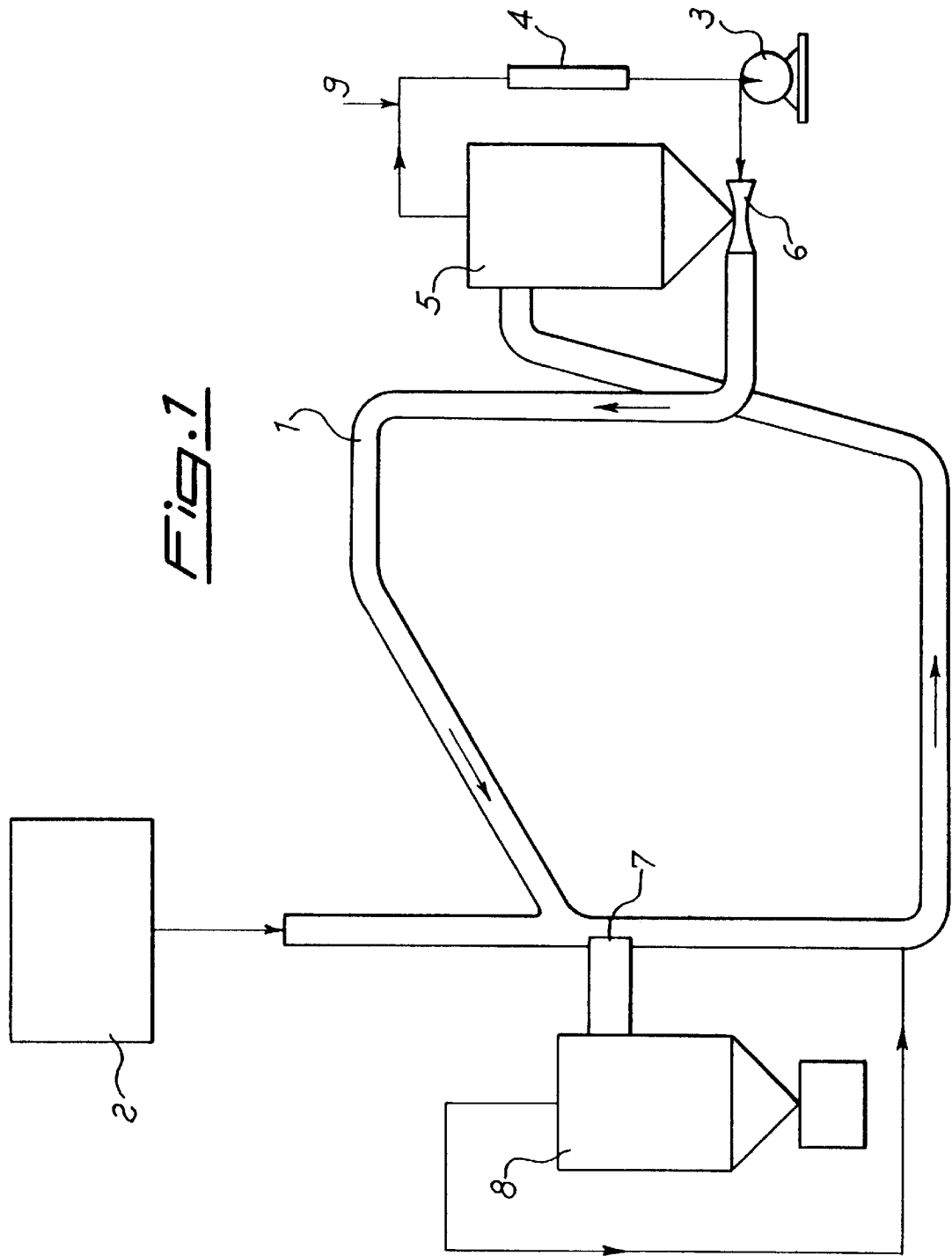
FIG. 1 is a schematic illustration of an apparatus according to the invention.

With reference to FIG. 1 said apparatus comprises a gas-loop (1), means (2) for feeding the polymer particles and the additive particles into the gas-loop, means (3) for circulating a gas into the gas-loop, e.g. a blower, and means (4) for heating the said gas, for example a heating jacket around a portion of the pipe which constitutes the gas-loop (1).

It can be necessary to avoid that the resin particles enter the gas circulation device (3), so means (5) must be provided to separate the resin particles from the gas flow before the gas flow enters the blower (3) and means (6) to reintroduce the resin particles downstream of the blower.

Since the temperature of the gas is almost the same throughout the whole gas-loop, it can be desirable that the heating means (4) is placed in a region where the resin is not present in the gas flow, i.e. between the solid separation device (5) and the blower (3). If the process has to be carried out continuously, adequate means (2) must be provided adapted to continuously feed the solids into the gas-loop, e.g. loss-in-weight feeders. Also adequate means must be provided for continuously withdrawing the additivated polymer particles.

The withdrawal of the treated resin can be performed through a slot (7) in the wall of the gas-loop (1) at a suitable point; by varying the opening of the slot, the solids hold-up in the machine can be regulated. A solids separating device (8) can be also provided.

The gas exiting with the solid may be reintroduced at any suitable point into the gas-loop. A line (9) can be also be advantageously provided to replace the gas escaping in any way from the gas-loop, e.g. escaping with the withdrawn polymer particles.

It is preferable that the pipes constituting the gas-loop (1) be thermally insulated.

Dimension of the pipes and other constructive parameters can be calculated by the person skilled in the art.

The invention further provides additivated polymer particles obtainable by the process of the present invention, preferably wherein the polymer is selected from ethylene homopolymers, ethylene copolymers with a $C_3$–$C_{10}$ α-olefin, propylene homopolymers and propylene copolymers with ethylene or a $C_4$–$C_{10}$ α-olefin.

The following examples are here described to better illustrate and not to limit the invention.

EXAMPLES

Figure 2:
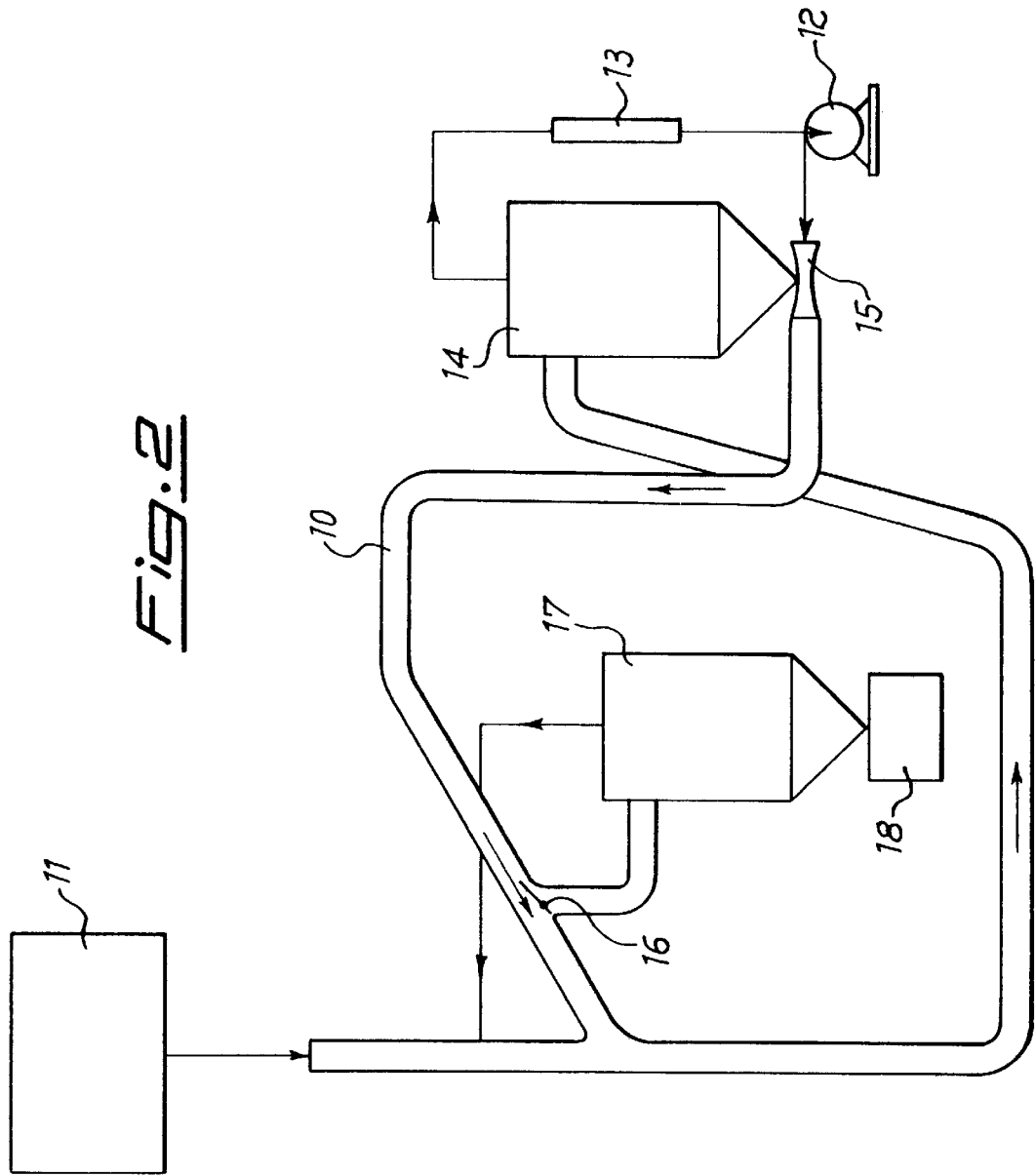
FIG. 2 is a schematic illustration of a particular embodiment of the apparatus of the invention.

Batch tests were performed in a pilot plant schematised in FIG. 2, using air as gaseous solids dragging means. The plant comprises: a gas-loop (10), a solids feeding hopper (11), a blower (12) for circulating the gas, an electric heating device (13) positioned around the pipe, a cyclone separator (14) to separate the solids from the gas stream, a Venturi pipe (15) to reintroduce the solids in the gas stream, a deviating valve (16), a second cyclone separator (17) for the final discharge of the product and a recipient (18) to collect the treated product. A temperature control device completed the apparatus. The tests were performed according to the following procedure: the valve (16) was positioned so as to shut out the circuit comprising the separator (17); the blower and the heating device were started; after having reached the programmed temperature the resin and the additive were introduced through the hopper (11). After one minute the valve (16) was positioned to force the stream to flow through the discharge cyclone (17) and the solid was recovered in tank (18). Four samples of 2.5 Kg each were prepared.

A. polypropylene homopolymer treated with 1500 ppm by weight of RED K 3580 (BASF). T=150° C.

B. polypropylene homopolymer treated with 1500 ppm by weight of TALCO HM005 (Industrie Minerarie Italiane—Fabi). T=150° C.

C. LLDPE treated with 1500 ppm by weigh of Syloblock45 (Grace). T=110° C.

D. LLDPE treated with 3000 ppm by weight of Syloblock45 (Grace). T=110° C.

In all samples A–D, the additives were completely incorporated into the resin; in fact, the red pigment, whilst being well visible on the granules surface, did not colour any surface with which the additivated particles came into contact.

What is claimed is:

1. A process for preparing thermoplastic polymer particles additivated with powdery additive particles, the additive having a melting point higher than that of the polymer, the said process comprising the following steps:

a) creating a molten or softened polymer layer on the surface of the polymer particles, while keeping the polymer particles under fluidization;

b) introducing the polymer particles and the additive particles, simultaneously or in whatever order, in a same volume region where, on average, the relative velocity between a polymer particle and an additive particle is higher than that between two polymer particles, the difference of velocities being able to provide impacts between the additive particles and the polymer particles such that the additive particles are forced into the molten or softened layer on the surface of the polymer particles.

2. The process according to claim 1, wherein the polymer particles and the additive particles are kept dragged in the same volume region by a gas flow.

3. The process according to claim 2, wherein the temperature of the gas is from 10 to 20° C. below the melting point of the polymer particles.

4. The process claim 2, which is performed in a gas-loop.

5. The process according to claim 4, which is performed in continuous, whereby means for introducing the polymer particles and the additive particles and for withdrawing the obtained additivated polymer particles are provided.

6. The process according to claim 4, which is performed by batch operation.

7. The process according to claim 1 wherein the polymer particles are made of a polymer selected from ethylene homopolymers, ethylene copolymers with a $C_3$–$C_{10}$ α-olefin, propylene homopolymers and propylene copolymers with ethylene or a $C_4$–$C_{10}$ α-olefin.

8. The process according claim 1 wherein the additive particles are selected from pigments, silica, talc.

9. The process according claim 2 wherein the gas employed is nitrogen.

* * * * *